May 29, 1951 D. S. MELLETT 2,554,715
FLOW METER
Filed Sept. 12, 1944
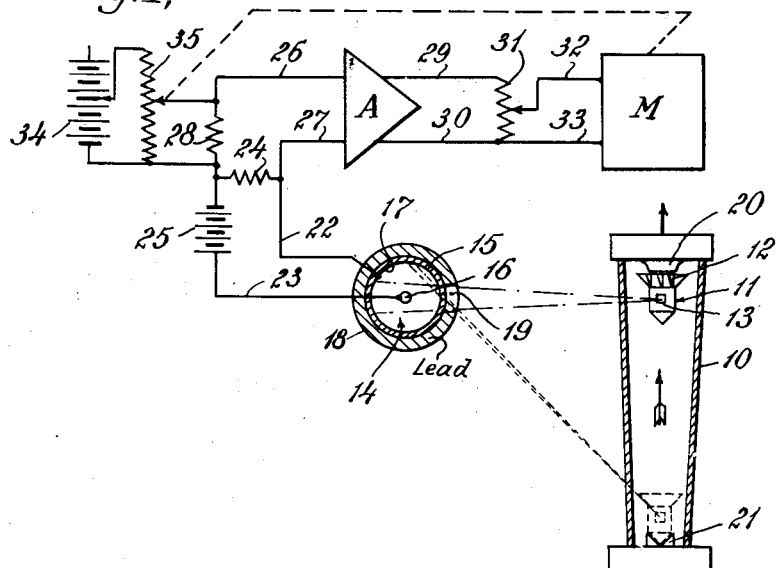
Fig. 1.
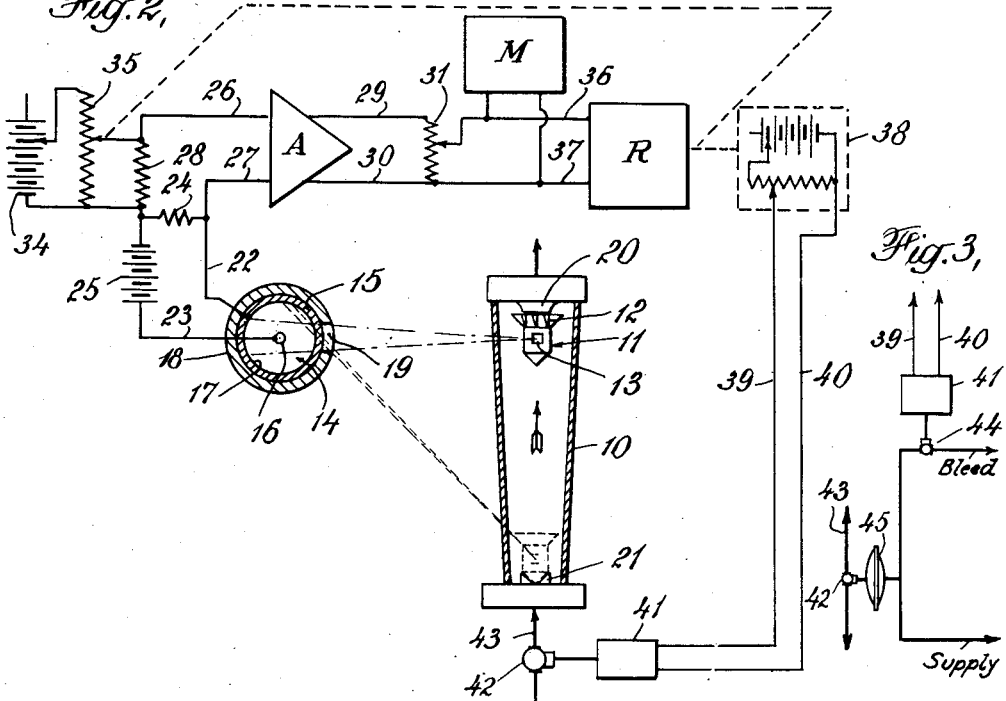
Fig. 2.
Fig. 3.
INVENTOR
Dana S. Mellett
BY James Y. Cleveland
ATTORNEY Patented May 29, 1951

2,554,715

UNITED STATES PATENT OFFICE 2,554,715

FLOW METER

Dana S. Mellett, Dearborn, Mich., assignor to Socony-Vacuum Oil Company, Incorporated, New York, N. Y., a corporation of New York Application September 12, 1944, Serial No. 553,702

6 Claims. (Cl. 73—209)

This invention relates generally to flow meters and particularly to that type of flow meter known in the art by the trade name "Rotameter."

This type of flow meter is used to accurately measure rates of flow of oil, air, gas, chemicals, water and other fluids, both liquid and gaseous. It consists essentially of a vertical tube, having a bore that tapers from a large diameter at the top to a smaller diameter at the bottom, and a top-shaped rotor disposed and held in suspension by the upward flow of liquid or gas as it passes through the tube from bottom to top. The rotor is entirely free and is caused to rotate by means of specially shaped slots cut in its head against which the fluid passing through the tube impinges. The rotor, due to its shape and rotation, remains in the center of the fluid stream and only moves vertically along the axis of the tube when the rate of flow of liquid or gas through the tube changes. The annular space between the rotor and the tube through which the fluid passes increases as the rotor is carried upward by increasing flow. The position of the rotor is therefore in direct relation to the rate of flow and its calibration is substantially a straight line. This is due to the fact that the flow head, as determined by the weight of the rotor, on the annular orifice defined by the rotor and the inner wall of the tube remains constant and the area of the orifice varies directly as the fluid flow.

Prior to the present invention flow meters of this type have been equipped with tapered tubes made of chemical glass, transparent, synthetic material or of metals. When metals were used the tubes were provided with sight windows of transparent material so that the position of the rotor could be observed. In every instance the operation of the flow meter depended upon the observer's ability to see the position of the rotor and an indicator carried by the rotor, or to determine electrically the position of an iron core which is carried by the rotor and is adapted to move in an impedance coil. The indicator or core extends from the rotor to a vertically aligned chamber that communicates with the tapered tube of the flow meter.

Although flow meters of the type described above have met with commercial success their use is limited. Those in which the rotor, or indicator carried thereby, must be viewed are obviously restricted to the metering of transparent fluids whose temperatures do not exceed approximately 800° F. Those which operate to vary the impedance of a coil are limited to a material whose melting point does not exceed 300° F., because it is necessary to keep the material in a liquid state in the solenoid zone. If the material solidifies in the solenoid zone, mechanical motion of the core ceases, rendering the instrument useless. At 300° F. it is difficult to retain insulation and serious disturbances are set up in the electrical section due to resistance changes in the solenoid.

The present invention is directed to improvements in the above-described type of flow meters and has for its principal object the provision of novel means for determining the position of the rotor when metering transparent or non-transparent fluids whose temperatures can be any value up to and exceeding 2000° F.

Another object of this invention resides in the provision of a flow meter in which the position of the rotor can be detected through tubes made of iron, steel or other metal alloys.

The invention also contemplates a flow meter of the type described having a rotor whose position can be detected by radioactivity.

Still another object of this invention is to provide a flow meter, of the type described, having a rotor which carries a radiation emitting substance that will give off radiation that can be detected at a point outside the tube by detecting means such as an ionization chamber, Geiger-Müller counter, or other means for detecting radiations.

This invention further contemplates a flow meter of the type described having a rotor which carries a radiation emitting substance, a detector of radiation for locating the position of the emitting source, and an indicator and/or a recorder which will be actuated to indicate and/or record the detected radiation in terms of flow.

Other objects and advantages of the present invention will become apparent from the following detailed description when considered with the drawings in which Figure 1 illustrates diagrammatically a preferred form of the present invention;

Figure 2 illustrates the present invention as applied in controlling flow; and

Figure 3 illustrates the manner in which the present invention can be used in a pneumatic system to control flow.

Referring to the drawings in detail, particularly Figure 1, a tapered tube 10, that is adapted to be connected into a flow line in such a manner that its longitudinal axis will be vertical and its smallest inside diameter will be at the bottom, is provided with a rotor 11. The head of rotor 11 is provided with slots 12 so formed that when fluid passes through tube 10 in the direction indicated by the arrows the rotor will rotate about its vertical axis. The fluid in its passage will lift the rotor 11 and hold it in suspended position. The amount of elevation of the rotor is dependent upon the weight of the rotor 11, the taper of tube 10 and the amount of fluid passing through the tube.

Tube 10, in the prior art, has been made of some transparent material so that the position of the rotor relative to a scale could be observed as an indication of the flow. The scale was either etched on the tube or disposed adjacent a window in a housing that surrounded the tube. Wherever an opaque tube was used an indicator carried by the rotor extended into a communicating sight chamber that was formed of transparent material.

Tube 10, according to the present invention, may be formed of steel, other alloys of metals, or any opaque substance that is transparent to radioactive radiations. A capsule 13 containing a source of radiation is carried by the body of the rotor 11. The source may be one that will give off neutron, gamma rays, neutrons and gamma rays, X-rays, or any other penetrating radiation.

Some of the radiation emitted by the source is detected by an ionization chamber 14. The ionization chamber 14 may be located adjacent the tube 10 with its longitudinal axis horizontal and approximately even with or a little above the top of tube 10. The ionization chamber comprises a housing 15 containing an ionizable medium in the form of a gas preferably under superatmospheric pressure. Disposed in the ionizable medium are two electrodes, an inner electrode 16 and an outer electrode 17. Outer electrode 17 may be a coating of conductive paint that is spaced from the inner wall of the ionization chamber by a coating of insulating paint. The inner electrode is tubular in form and may be any suitable metal.

In order to make the ionization chamber directional in the detection of radiation it may be enclosed in a lead envelope 18 except for a narrow longitudinal window 19. Window 19 is located directly in line with the inner electrode 16 of the ionization chamber and the capsule 13 when the rotor is in its highest position, i. e. against the stop 20. In this manner the maximum detection of radiation will occur when the rotor 11 is at its highest position. As rotor 11 drops to its lowest position, as shown in dotted lines, i. e. against the bottom stop 21, the radiation detected will be a minimum. Therefore, as the rotor drops less radiation will enter the ionizable medium due to the change of incident angle at the window 19. Thus, it can be seen that the detected radiation is a function of the position of rotor 11.

This change in radiation produces a corresponding change in the ionization of the ionizable medium in the ionization chamber. The change in ionization produces a proportional change in the direct current flowing in the external circuit connected across the ionization chamber electrodes. The current flowing at any instant in this external circuit, after amplification, actuates the meter M an amount which is proportional to the vertical position of the rotor.

It is to be understood that the present invention is not to be limited to the use of the shield having a window therein, but may be practiced without the shield.

The ionization chamber electrical circuit is conventional and comprises the electrodes 16 and 17, conductors 22 and 23, resistance 24 and battery 25. The current flowing in this circuit varies according to the radiation detected. This current flowing through the resistance 24 produces a proportional IR drop that is impressed on the input of an amplifier A by the conductors 26 and 27 through resistance 28. This voltage is amplified and rectified by the amplifier A and fed into an indicating meter M by conductors 29 and 30, potentiometer 31, and conductors 32 and 33. With the scale of the meter M calibrated in terms of flow it will indicate directly the rate of flow of the fluid through tube 10.

In order to bring the indicator or recorder M into the range of 0% to 100% flow for the radiation emitted at the bottom and top positions of the float, there is provided a battery 34 and a voltage divider 35 therefor. The voltage divider supplies a potential to the resistance 28 which can be adjusted so that when the float is at its bottom position the current in the amplifier input circuit will be zero and the meter M will read zero. The potentiometer 31 is provided to take care of the upper threshold. When the float is in the top position, potentiometer 31 can be adjusted to make meter M read full scale. With this arrangement the meter M can be calibrated for any type of fluid that it is desired to meter.

The voltage divider 35 may be manually set or it may be a slide wire operated by the meter M after the voltage supplied by battery 34 has been adjusted. The U. S. Patent, Number 2,219,274, to Scherbatskoy, shows and describes such a null system.

As illustrated in Figure 2, if it is desired to record the flow, a portion of the output of the amplifier A can be made to simultaneously actuate a recorder R through conductors 36 and 37. Additionally, by a conventional potentiometer slide-wire control 38 the recorder R can be made to supply energy through conductors 39 and 40 to electrical means 41 for controlling a valve 42 in the flow line 43.

This invention is equally applicable to pneumatic systems of fluid flow control. As shown in Figure 3 the conductors 39 and 40 may supply current to an electrically operated valve 44 in the bleeder line of a pneumatically controlled valve 45 in the flow line 43.

Although an ionization chamber has been shown in the drawings and referred to in the specific description of the invention, it is to be understood that this invention also contemplates the use of Geiger-Müller counters or other detectors of radioactivity.

The meter according to this invention can be used for extremely high pressures as well as temperatures up to the limit of the metal enclosing the rotor.

I claim:

1. An indicator for a flow meter of the rotameter type that comprises a radioactive substance capable of emitting penetrating radiation carried by the rotor of the flow meter, means positioned adjacent the tapered tube of the flow meter for detecting radiation from said radioactive substance, the intensity of said detected radiation being indicative of the position of said rotor, and means for indicating the intensity of the detected radiation.

2. An indicator for a flow meter of the rotameter type that comprises a radioactive substance capable of emitting penetrating radiation carried by the rotor of said flow meter, means positioned adjacent the tapered tube of the flow meter for detecting radiation from the radioactive substance, a shield opaque to radioactive radiation for said detecting means, said shield having a window therein through which radiation can pass to reach the detecting means, the intensity of said detected radiation being indicative of the position of said rotor, and means for indicating the intensity of the detected radiation.

3. An indicator for a flow meter of the rotameter type that comprises a radioactive substance capable of emitting penetrating radiation carried by the rotor of said flow meter, an ionization chamber positioned adjacent the tapered tube of the flow meter for detecting radiation from the radioactive substance, a shield opaque to radioactive radiation for said ionization chamber, said shield having a window therein through which radiation can pass to reach the ionization chamber, the intensity of said detected radiation being indicative of the position of sad rotor, and means for indicating the intensity of the detected radiation.

4. An indicator for a flow meter of the rotameter type that comprises a radioactive substance capable of emitting penetrating radiation carried by the rotor of the flow meter, means positioned adjacent the tapered tube of the flow meter for detecting radiation from said radioactive substance in proportion to the vertical position of the rotor, the intensity of said detected radiation being indicative of the position of said rotor, and means for indicating the intensity of the detected radiation.

5. An indicator for a flow meter of the rotameter type that comprises a radioactive substance capable of emitting penetrating radiation carried by the rotor of said flow meter, an ionization chamber positioned adjacent the tapered tube of the flow meter and having electrodes therein for detecting radiation from the radioactive substance in amounts proportional to the vertical position of the rotor and therefore the rate of flow of fluid through the flow meter, an electrode circuit for said ionization chamber including a source of potential and a resistance in series with the electrodes of said chamber, means for amplifying the voltage produced across said resistance as a result of the current flowing in the ionization chamber circuit, a meter, and means for conducting the amplified voltage to said meter for actuating it in accordance with the rate of flow of fluid through said flow meter.

6. An indicator for a flow meter of the rotameter type that comprises a radioactive substance capable of emitting penetrating radiation carried by the rotor of said flow meter, an ionization chamber positioned adjacent the tapered tube of the flow meter and having electrodes therein for detecting radiation from the radioactive substance in amounts proportional to the vertical position of the rotor and therefore the rate of flow of fluid through the flow meter, a shield substantially opaque to radioactive radiation for said ionization chamber, said shield having a window therein through which radiation can pass to reach the ionization chamber, an electrode circuit for said ionization chamber including a source of potential and a resistance in series with the electrodes of said chamber, means for amplifying the voltage produced across said resistance as a result of the current flowing in the ionization chamber circuit, a meter, and means for conducting the amplified voltage to said meter for actuating it in accordance with the rate of flow of fluid through said flow meter.

D. S. MELLETT.

REFERENCES CITED

The following references are of record in the file of this patent:

UNITED STATES PATENTS

| Number | Name | Date |
| --- | --- | --- |
| 280,322 | Nash | June 26, 1883 |
| 1,499,839 | Nicholson | July 1, 1924 |
| 1,662,429 | Lowy | Mar. 13, 1928 |
| 1,877,810 | Chamberlain | Sept. 20, 1932 |
| 1,993,527 | Mears | Mar. 5, 1935 |
| 1,955,315 | Styer | Apr. 17, 1934 |
| 2,154,375 | Chambers | Apr. 11, 1939 |
| 2,260,516 | Gerber | Oct. 28, 1941 |
| 2,303,890 | Moore | Dec. 1, 1942 |
| 2,316,239 | Hare | Apr. 13, 1943 |
| 2,317,807 | Ryder | Apr. 27, 1943 |
| 2,323,128 | Hare | June 29, 1943 |
| 2,325,884 | Schorn | Aug. 3, 1943 |